Oct. 20, 1936.　　　G. DE BEESON　　　2,058,004
MAGNETIC COMPASS
Filed April 18, 1934　　3 Sheets-Sheet 1

INVENTOR
GEORGE DE BEESON
BY
ATTORNEY

Oct. 20, 1936.  G. DE BEESON  2,058,004
MAGNETIC COMPASS
Filed April 18, 1934    3 Sheets-Sheet 2

INVENTOR:
GEORGE DE BEESON
ATTORNEY

Oct. 20, 1936.  G. DE BEESON  2,058,004
MAGNETIC COMPASS
Filed April 18, 1934   3 Sheets-Sheet 3
FIG. 3.
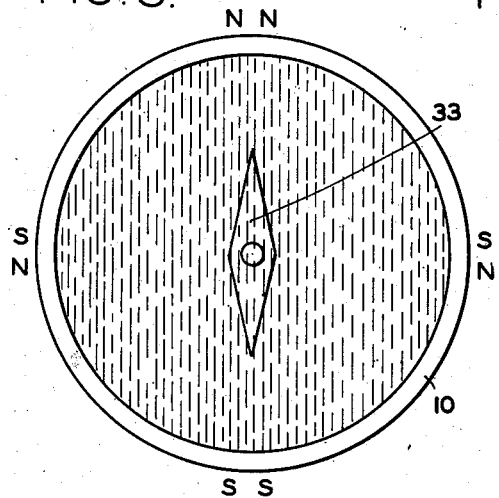
FIG. 4.
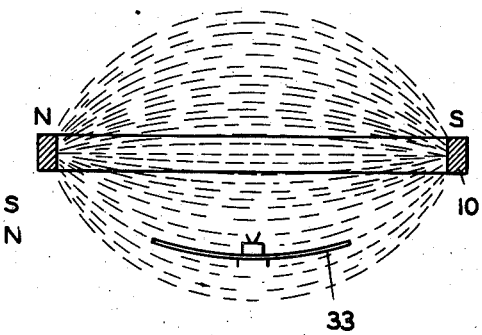
FIG. 5.
FIG. 6.
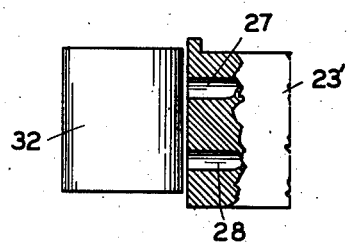
FIG. 8.
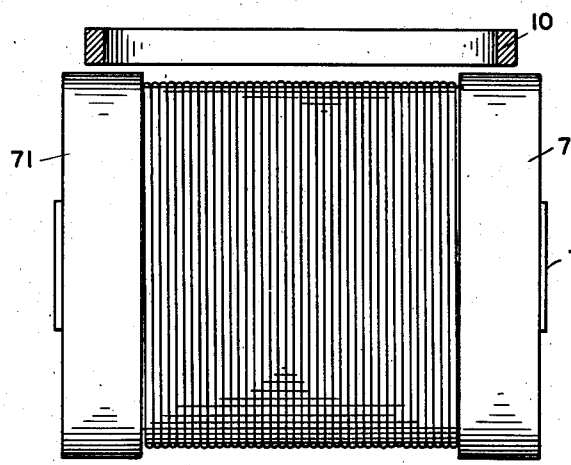
FIG. 7.
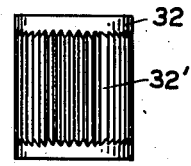
INVENTOR:
GEORGE DE BEESON
BY
ATTORNEY Patented Oct. 20, 1936

2,058,004

UNITED STATES PATENT OFFICE 2,058,004

MAGNETIC COMPASS

George De Beeson, Glendale, Calif., assignor, by mesne assignments, to Kormann Aero-Safety Appliance, Inc., a corporation of Nevada Application April 18, 1934, Serial No. 721,102

8 Claims. (Cl. 33—222)

This invention relates to improvements in magnetic compasses and more particularly to the directional element thereof.

I have devised a method by which a ring may be magnetized and show accurately defined north and south poles with straight parallel lines of force within the area of the ring from north to south. The parallelism of these lines is not seriously affected by magnetic influences extraneous to the encircled area.

I have also discovered that such a permanently polarized magnetic ring suspended upon a suitable pivot is more sensitively responsive to the pull of the north magnetic pole and less responsive to extraneous magnetic influences than the conventional compass needle.

An object of the invention is to increase the responsive force of the directive element in magnetic compasses.

Another object is to embody the above improvements in magnetic compasses adapted to the requirements of avigation, navigation and the control of dirigible crafts requiring precision in maintaining their reckoned courses.

Another object is to combine remote control means with the compass for robot or automatically actuated mechanisms for maintaining such craft true to any predetermined course based upon the directional attraction of the north magnetic pole.

Another object is to provide a directional compass particularly suitable for the exacting requirements of avigation that will indicate a true horizontal level, in addition to the usual "lubber" line, to indicate longitudinal inclination and banking angles.

A further object is to provide a compass card and directional element entirely submerged in liquid with the required degrees of freedom in both the horizontal and vertical planes of movement, and adapted to transmit its directive force to control means for applying power to remote mechanisms without interfering with the sensitiveness of the directional element.

Other objects and advantages will appear as the description progresses.

In this specification and the accompanying drawings the invention is disclosed in an embodiment adapted to avigation. It is to be understood, however, that it is not limited to this form because it may be embodied in other forms and adaptations without departing from the spirit of the invention as defined in the claims following the description.

In the three sheets of drawings:

Fig. 3 is a plan view from above diagrammatically illustrating the parallelism of the lines of force within the magnetic field of the compass ring.

Fig. 4 is a side view of the same showing the approximate curves of the lines of force from pole to pole above and below the plane of the ring.

Fig. 5 is a fragmentary detail in partial horizontal section showing the magnetic armature controlled valve cylinder and portage of the remote control mechanism.

Fig. 6 is a similar detail in partial vertical section of the same.

Fig. 7 is a rear elevation of the fluted cylindrical valve.

Fig. 8 is a schematic view in side elevation of the ring magnetizing apparatus.

Figure 1:
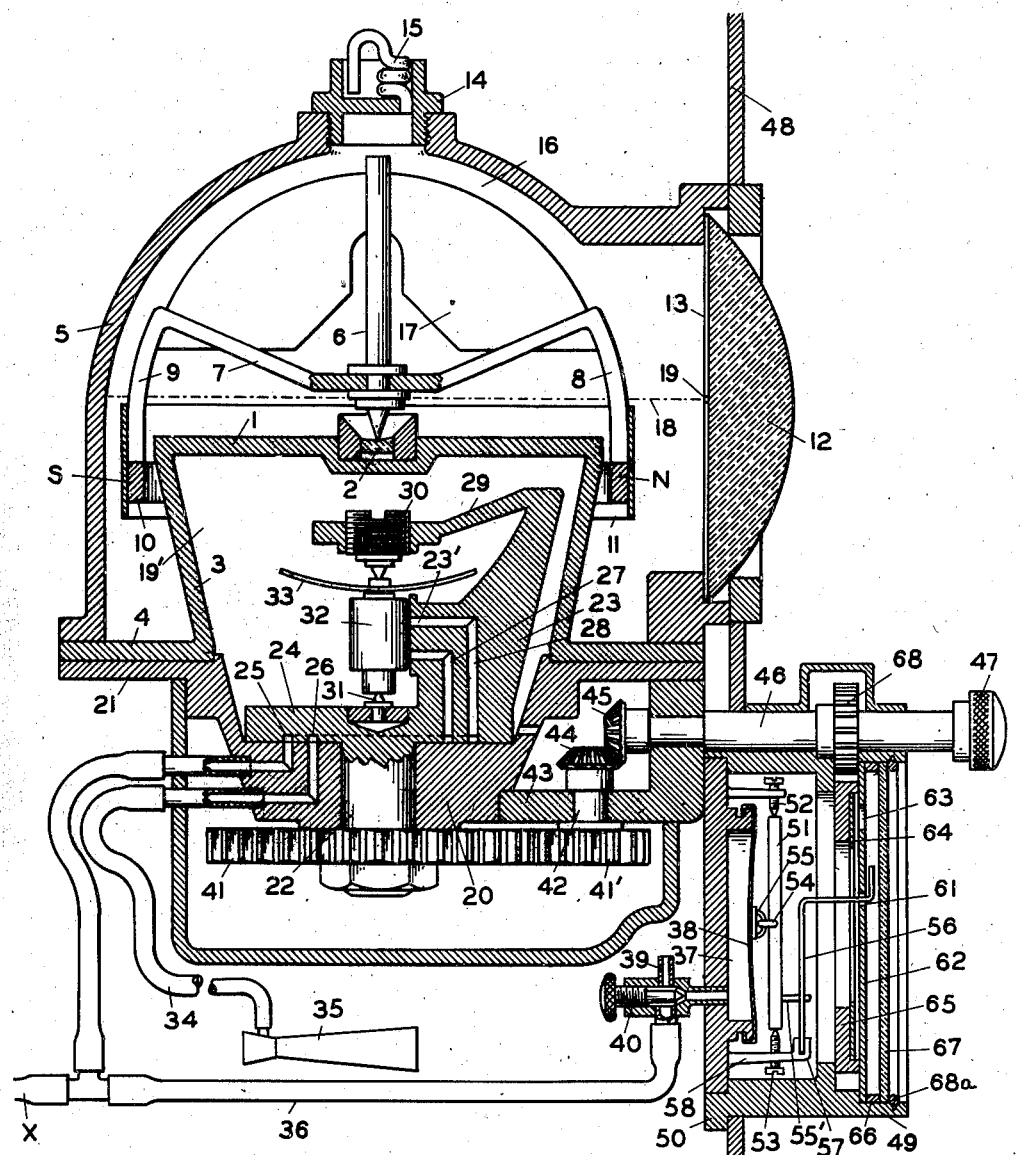
Fig. 1 is a vertical section of an aircraft compass constructed in accordance with this invention and having robot control means combined therewith.

Describing in detail the construction illustrated in the drawings and referring to Fig. 1, the compass unit comprises the base 1 having the axial pivot jewel bearing 2. The base has the inwardly tapering walls 3 with the outwardly extending annular flange 4.

The dome cap 5 is fixed to the base 1 to form a fluid tight chamber within which the directional element is supported on the pivot 6 resting in the jewel 2. This pivot is fixed in the spider 7 having the depending ends 8 and 9. The polarized magnetic ring 10 is fixed to the ends 8 and 9 preferably with the spider arranged across the diameter of the ring with the ends 8 and 9 indicating the respective north and south poles of the sensitive element.

The cylindrical compass card 11 is fixed to the directional element and has the usual N, S, E, W, and intermediate directional degrees indicated thereon. The side wall of the dome 5 is provided with an opening sealed by the magnifying lens 12 through which the compass card 11 can be viewed in relation to the lubber line 13 formed by a groove in the rear wall of the lens 12 and filled with a white enamel or other contrasting substance. It is the usual practice to make the lubber line, and the directional indices and graduations white in contrast to the black background of the compass card.

The pivot 6 and the assembly thereon being freely suspended on the jewel 2 forms the directional unit of the compass which at all times maintains its fixed directional position with respect to the north magnetic pole as indicated by N on the compass card registering with the lubber line 13.

The enclosing casing formed by the base 1 and the dome 5 may be filled with a suitable liquid through the top opening in the dome which is normally closed by the plug 14. The coiled tube 15 having one end open to the dome and the other open to the atmosphere provides for the escape of air bubbles and occluded gases within the dome. It also compensates for expansion and contraction of the liquid 16 due to atmospheric and other thermal conditions.

This liquid 16 acts as a dampener to prevent undue disturbance of the sensitive directional element during violent maneuvering of the craft upon which the compass is mounted. To this end the vanes 17 are added to the directional unit. The width of the spider 7 working in the liquid 16—16' dampens the vertical tilting or pendulous swing of the directional unit in the same manner that the vanes 17 retard its horizontal swing on its pivot 6—2. This combined dampening prevents jerky and erratic behavior of the compass during violent maneuvering of the air craft and reduces the "rolling error". The hunting period is also reduced as to time and oscillation. The true north once found is maintained during all practicable avigating conditions.

This liquid 16 can be made to serve the further purpose of a "spirit level" This is accomplished by filling the dome casing 1—5 with two forms of immiscible liquids of contrasting colors and different specific gravities so that they will stratify. The line of demarcation 18 between the liquids 16—16' forms a horizontal plane indicating a true level, observable through the lens 12. The lens may be provided with a transverse line 19 at 90° to the lubber line with which the plane 18 will aline at dead level. Deviations from this coincidence will indicate the amount of departure from level in ascending, descending and banking the craft.

The ring 10 is preferably suspended below the pivotal center 2 to give pendulum balance. It is free to rotate and to rise and fall in the annular space between the base wall 3 and the surrounding wall of the dome 5, to allow the necessary freedom of action of the base 1 beneath and within the ring 10.

The external appearance and the general behavior of the compass and the reading indicia have been purposely conventionalized to avoid confusion in practice. However, the directional sensitiveness and the construction of the directional element mark a distinct departure in the art as now known to me.

By laying a sheet of paper over the magnetized ring 10 and dusting iron filings over it, it will graphically show that they arrange themselves in parallel lines from N to S, see Fig. 3, indicating that the lines of force within the magnetic field of the ring are also parallel. There is a very slight bending of the lines adjacent the sides of the ring farthest removed from the polar center N—N, S—S, as they approach N—S, N—S, as indicated in Fig. 3. Outside the ring the lines of force are indefinite in pattern and vagrant in behavior, depending upon surrounding conditions. Apparently the magnetic field within the ring is isolated from mass influences by hyper-sensitive to polarized influences such as the natural north magnetic pole or the proximity of another highly polarized magnet.

Two semicircular magnets with their respective polar ends N—N, S—S, in repulsive relation to form a ring divided on its diameter, has the same effect as the continuous ring. But for mechanical reasons the continuous ring is preferred. Any suitable steel or magnetizable alloy is suitable for the present purpose, depending upon the attraction force desired in the directional element.

External to the plane of the ring 10 the lines of force would appear to make a pattern similar to that shown in Fig. 4, distinguished from the meeting of the concentric lines of force between the opposed poles of bar, horse-shoe and other types of magnets. These explanations are tentative and are offered for what they are worth in aiding those entitled to practice this invention. But they are not to be construed as in any way limiting the scope of the invention which would appear to upset much of the known science of magnetism.

The directive force of the magnetic compass is so slight that no contact means for transmitting its indications can be tolerated. But due to the peculiarities of the magnetic field set up in the present ring magnet it is possible by indirect means to actuate remote controls for the application of power for the control of dirigible craft.

Referring again to Fig. 1 the chamber 19' within the walls 3 has the bottom 20 with a lateral flange 21 fixed to the base flange 4 and the edge of the dome to form a closed casing divided horizontally by the base plate 1.

Coaxially with the pivot 6, the bottom 20 is bored to form a bearing for the shaft 22 of the movable valve block 23, having the circular head 24 fitting tightly the plane of the bottom 20. The bottom of the block 23 has two grooves 25 and 26 concentric with the shaft 22. The block 23 has two ports 27 and 28 leading upward from the grooves 25 and 26 respectively and terminating in vertical alinement in the arcuate head 23', see Figs. 5 and 6.

The arm 29 on the valve block terminates above the shaft 22 and carries an adjustable pivot 30 in alinement with a similar pivot 31 alined with the axis of the shaft 22. The cylindrical valve 32 is rotatably mounted between the pivots 30 and 31. The needle armature 33 fixed to the valve 32 is composed of soft iron or other responsive material that will not become permanently magnetized. This armature is pointed at each end and arranges itself in line with the parallel lines of force existing across the ring 10 between N—N and S—S, as previously described. It maintains this polarized relation so long as it is within the circumscribed magnetic field of the ring 10; turning in perfect and undeviating accord with the lines of force established in the ring and flowing from the earth's north magnetic pole. The present magnetic compass may be subject in a minimized degree to the variations, deviations, rolling errors and other natural deficiencies of any magnetic compass, but the armature needle 33 never departs from the polar directional line established by the ring 10 regardless of ordinary extraneous influences exerted against the ring. It is good practice to curve the longitudinal plane of the needle 33, see Fig. 4, so that it alines with the lateral magnetic lines flowing from the poles of the ring 10 so that the ends of the needle point toward the circumference of the ring as the base 1—20 oscillates with respect to the plane of the ring.

The suction line 34 is connected with the groove 26 and port 27 and to the Venturi tube 35 through which suction is created by the velocity of the aircraft. Atmospheric air is drawn between the arcuate head 23' concentric with the periphery of the valve 32 without affecting the port 28 until the fluted portion 32', see Fig. 7, of the valve is brought into alinement with the ports 27 and 28 at which time the suction in 27 draws against the groove 25 and the tube 36 to collapse the pouch 37 covered by the flexible diaphragm 38. By means of the bypass 39 controlled by the manual needle valve 40 the suction line 36 may be bled to control the amount of suction exerted against the diaphragm 38.

The action of this diaphragm 38 is indicative of the power applied by the Venturi tube 35 as controlled by the valve unit 23—32. The force exerted by one or a group of such diaphragms may be synchronized to control a ship, make graphic records of courses followed, actuate repeaters, relays and the like, under the immediate control of the magnetic directional unit 10.

The spur gear 41 is fixed on the end of the shaft 22 and meshed with the pinion 41' on the shaft 42 journaled in the bracket 43 fixed to the bottom 20. The bevel gear 44 is fixed on the shaft 42 and meshed with the similar gear 45 which is fixed on the end of the shaft 46 extending through the bracket 43 and provided with the knurled knob 47.

Manual turning of the knob 47 acting through the train of gears just described will rotate the valve head 23' around the valve 32. When the ports 27—28 register with the grooves 32' the pouch 37—38 is collapsed, as described. When the ports 27—28 register with the smooth periphery of the valve 32, there is no suction exerted upon the pouch and the diaphragm 38 is restored by atmospheric pressure through the bypass 39.

The compass mechanism is attached to and supported upon the front panel 48 by a bracket (not shown) extending from the panel and secured beneath the flange 21.

The course indicator mechanism is enclosed within the cylindrical case 49 projecting through the panel and having lugs on the back 50 fixed to the back of the panel. The pouch 37 is formed in the back of the case 49, lateral to the axis of the case. The vertical shaft 51 is pivoted at 52 and 53 to the back 50 and has the lateral arm 54 engaging in the stirrup 55 fixed to the diaphragm, also slightly lateral to the axis of the diaphragm to reduce the leverage against the arm 54.

Figure 2:
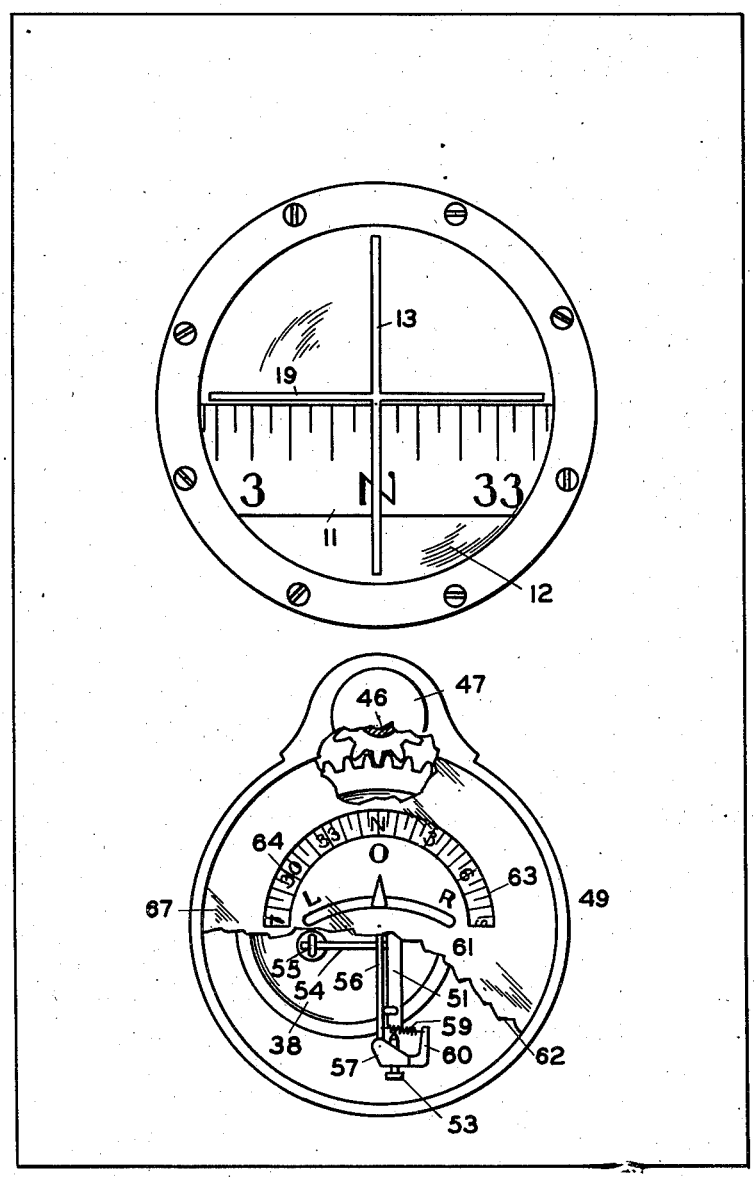
Fig. 2 is a front view of the same showing the relation of the compass to the remote control accessory.

The shaft 51 has another arm 55' which engages behind the index arrow 56 which is pivoted at 57 on the bracket 58. By this arrangement the evacuation of the pouch and diaphragm pulls the index 56 toward the left. It is normally urged toward the right by the pull of the coil spring 59 having one end attached to the index and the other end attached to the extension 60 on the bracket 58 (see Fig. 2).

The index needle 56 is offset to extend through the arcuate slot 61 in the dumb plate 62 which is marked zero, L and R to indicate neutral and left and right, respectively. This plate also has the arcuate window 63 to disclose the annular course card 64 concentrically set into the ring gear 65 rotatable in a concentric socket in the case 49. The dumb plate 62 holds the ring gear in its socket. The spacing ring 66 is interposed between the glass 67, held in the front of the case by the expansive ring 68a set in an internal groove in the bezel of the case 49.

The ring gear 65 meshes with the pinion 68 fixed on the shaft 46 and is the means by which the course of the craft is manually set. If it is desired to fly due north, the knob 47 is turned to bring the index N on the course card 64 at the top of the case opposite zero, "0", on the fixed dumb plate 62. This turning of the knob 47 transmitted through the train of gears previously described, swings the head 23' until the ports 27 and 28 split the distance between the edge of the blank periphery 32" and the first groove at 32' on the valve 32, see Fig. 5. The valve is held fixed by the compass ring 10 and the head 23' is fixed to the ship. The suction on the line 34 thus split counterbalances the tension of the spring 59 which also holds the index needle 56 at the zero point, "0". If the ship deviates to the left it moves the head 23' and the ports 27—28 onto the blank periphery 32" of the valve 32. This actuates the robot mechanism through the tube 4 to shift the rudder to restore the ship to its course N. If the deviation is to the right the ports 27—28 are opened full to the suction and the rudder action is automatically shifted to restore the ship to the set course.

If it were desired to change the course say to north-east, the knob 47 would be turned to bring the dial 64 so that the desired point intermediate N and E would register on zero 0. The appropriate robot rudder action would automatically continue until the ship pointed north-east. The head 23' having moved out of the north position with respect to the valve 32 to the intermediate position set by the knob 46, the relative position of valve 32 and head 23' would be restored as in Fig. 5 and the ship held to the new course.

Shifting the new course to the right throws the index needle 56 over to the left indicating that the ship's nose is still to the left of the new course, the needle 56 approaching zero 0 as the ship's nose turns N to E. The index needle 56 at all times indicates the actual direction of the ship's flight with respect to the set course indicated at zero 0.

The robot has not been disclosed because it is subsidiary to the valve mechanism and the present disclosure is confined to the compass unit and its accessory the course indicator combined therewith. The robot derives its power from an independent motor or other source of power applied by the valve combination. No suction 23' on the periphery 32" of the valve causes the robot to set the rudder for right turn; contrawise suction 23' on the grooved side 32' of the valve results in a left turn of the rudder through the robot. For particulars regarding the robot mentioned see the Patent #1,829,790 issued to me on the 23rd day of November 1931, entitled "Automatic airplane controls".

A method of magnetizing the ring 10 is illustrated in Fig. 8. Any properly proportioned electromagnet may be used. The soft iron core 70 joins the annular pole pieces 71, 72. The spool thus formed is wound with wire in the conventional manner.

The plane of the ring should be exactly parallel to the axis of the coil. The axis of the ring should be perpendicular to the axis of the coil. The ring should be lifted out of the magnetic field without tipping or tilting it out of the relations above set forth. Any deviation in such relations will shift the location of the respective poles N—N, S—S off the true diameter of the ring.

Having thus described this invention, what is claimed and desired to secure by Letters Patent is:

1. A compass apparatus including a pivotally mounted magnet member, a magnetically sensitive armature pivotally mounted independently of said magnet member and within the magnetic field thereof so as to be controlled by and aligned at all times with the magnetic poles of said member, a valve member connected with and positioned by said armature, said valve member having a surface movable past and closely adjacent a port from which a fluid is expelled, said member having smooth and fluted portions whereby to respectively decrease or increase the discharge from said port, in accordance with the portion opposite the same.

2. A compass apparatus including a pivotally mounted magnet member, a magnetically sensitive armature pivotally mounted independently of said magnet member and within the magnetic field thereof so as to be controlled by and aligned at all times with the magnetic poles of said member, a valve member connected with and positioned by said armature, said valve member having a surface movable past and closely adjacent a port from which a fluid is expelled, said member having smooth and fluted portions whereby to respectively decrease or increase the discharge from said port, in accordance with the portion opposite the same, and means for manually rotating the port about the pivotal axis of said armature.

3. A compass apparatus including a pivotally mounted magnet member, a magnetically sensitive armature pivotally mounted independently of said magnet member and within the magnetic field thereof so as to be controlled by and aligned at all times with the magnetic poles of said member, a valve member connected with and positioned by said armature, said valve member having a surface movable past and closely adjacent a port from which a fluid is expelled, said member having smooth and fluted portions whereby to respectively decrease or increase the discharge from said port, in accordance with the portion opposite the same, and a diaphragm connected to be differentially influenced by the variations in the discharge from said port.

4. A compass apparatus including a pivotally mounted magnet member, a casing forming an enclosed chamber, an armature rotatably mounted within said casing substantially coaxial with and within the magnetic field of said magnet member so as to be held in alignment with the magnetic poles of said magnet member, a valve member carrying said armature and rotatable therewith, a rotatable support for said valve member and armature within said casing, a pair of ports in said support closely adjacent to the face of said valve member, said face of said valve member being fluted over one-half of its circumference so as to vary the flow between said ports according as a smooth or a fluted portion of said valve member is adjacent the ports.

5. A compass apparatus including a pivotally mounted magnet member, a casing forming an enclosed chamber, an armature rotatably mounted within said casing substantially coaxial with and within the magnetic field of said magnet member so as to be held in alignment with the magnetic poles of said magnet member, a valve member carrying said armature and rotatable therewith, a rotatable support for said valve member and armature within said casing, a pair of ports in said support closely adjacent to the face of said valve member, said face of said valve member being fluted over one-half of its circumference so as to vary the flow between said ports according as a smooth or a fluted portion of said valve member is adjacent the ports, and a diaphragm connected to be differentially influenced by the variations in the discharge from said ports.

6. A compass apparatus including a pivotally mounted magnet member, a casing forming an enclosed chamber, an armature rotatably mounted within said casing substantially coaxial with and within the magnetic field of said magnet member so as to be held in alignment with the magnetic poles of said magnet member, a valve member carrying said armature and rotatable therewith, a rotatable support for said valve member and armature within said casing, a pair of ports in said support closely adjacent to the face of said valve member, said face of said valve member being fluted over one-half of its circumference so as to vary the flow between said ports according as a smooth or a fluted portion of said valve member is adjacent the ports, and means for manually rotating the ports about the pivotal axis of said armature.

7. A compass apparatus including a pivotally mounted magnet member, a magnetically sensitive armature pivotally mounted independently of said magnet member and within the magnetic field thereof so as to be controlled by and aligned at all times with the magnetic poles of said member, a valve member connected with and positioned by said armature, said valve member having a surface movable past and closely adjacent a port from which a fluid is expelled, said member having smooth and fluted portions whereby to respectively increase and decrease the discharge from said port, in accordance with the portion opposite the same, a valve block providing said port, means for manually revolving the said block about the pivotal axis of said armature, and means operatively associated with said manual revolving means indicating the annular position of said block with respect to said armature.

8. A compass apparatus including a pivotally mounted magnet member, a magnetically sensitive armature pivotally mounted independently of said magnet member and within the magnetic field thereof so as to be controlled by and aligned at all times with the magnetic poles of said member, a valve member connected with and positioned by said armature, said valve member having a surface movable past and closely adjacent a port from which a fluid is expelled, said member having smooth and fluted portions whereby to respectively increase and decrease the discharge from said port, in accordance with the portion opposite the same, a valve block providing said port, means for manually revolving the said block about the pivotal axis of said armature, means operatively associated with said manual revolving means indicating the annular position of said block with respect to said armature, and a diaphragm connected to be differentially influenced by the variations and discharge from said port.

GEORGE DE BEESON.